United States Patent
Tsubotani

(10) Patent No.: US 12,058,521 B2
(45) Date of Patent: Aug. 6, 2024

(54) COMMUNICATION APPARATUS, CONTROL METHOD, AND STORAGE MEDIUM

(71) Applicant: CANON KABUSHIKI KAISHA, Tokyo (JP)

(72) Inventor: Daiki Tsubotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 17/685,240

(22) Filed: Mar. 2, 2022

(65) Prior Publication Data

US 2022/0312204 A1    Sep. 29, 2022

(30) Foreign Application Priority Data

Mar. 8, 2021  (JP) .................................. 2021-036293

(51) Int. Cl.
*H04W 12/08*   (2021.01)
*H04W 12/065*  (2021.01)

(52) U.S. Cl.
CPC ......... *H04W 12/065* (2021.01); *H04W 12/08* (2013.01)

(58) Field of Classification Search
CPC ............... H04L 63/083; H04L 63/105; H04L 63/0428; H04L 63/162; H04W 12/033; H04W 12/065; H04W 12/08
See application file for complete search history.

(56) References Cited

U.S. PATENT DOCUMENTS

| 2010/0082980 A1* | 4/2010 | Shiraki | ................... H04L 63/08 713/168 |
| 2010/0082999 A1* | 4/2010 | Ando | .................... H04W 12/02 380/270 |
| 2022/0232466 A1* | 7/2022 | Chen | ................... H04L 61/5092 |

FOREIGN PATENT DOCUMENTS

JP          2011120279 A       6/2011

* cited by examiner

*Primary Examiner* — Brian F Shaw
(74) *Attorney, Agent, or Firm* — Canon U.S.A., Inc. IP Division

(57) ABSTRACT

An apparatus includes an operation unit, a display unit, a communication unit, and a control unit, wherein the control unit controls the display unit to display, while indicating together as one item, a plurality of security methods compatible with a first authentication method out of authentication methods in Wi-Fi Protected Access® (WPA), wherein, in response to the item being selected, the control unit causes the operation unit to receive inputting of a password for connecting to an access point, and wherein the control unit varies a security method in WPA used when connecting to the access point based on a format or number of characters of the password.

20 Claims, 8 Drawing Sheets

FIG.7

| | 701 | 702 | 703 | 704 | | 705 |
|---|---|---|---|---|---|---|
| NETWORK PARTICIPATION PARAMETER NUMBER | 1 | 2 | 3 | 4 | ... | M |
| CONNECTION SEQUENTIAL ORDER | 1 | 2 | 3 | — | | — |
| SSID | Network-0001 | Network-abc | Network-1234 | — | | — |
| SECURITY | WPA/WPA2/WPA3-Personal | WPA/WPA2/WPA3-Personal | WPA/WPA2/WPA3-Personal | — | | — |
| CIPHER TYPE | TKIP/AES | TKIP/AES | TKIP/AES | — | | — |
| PASSWORD | abcdefgh | 0123456789abcdef0123 (FOR SHORT) | 123abc | — | | — |
| PASSWORD FORMAT | PASSWORD FORMAT A (8 OR MORE AND 63 OR LESS CHARACTERS) | PASSWORD FORMAT B (HEXADECIMAL NUMBER WITH 64 CHARACTERS) | PASSWORD FORMAT C (OTHER THAN PASSWORD FORMATS A AND B) | — | | — |
| CHANNEL | 1 | 8 | 5 | — | | — |
| IP ADDRESS ACQUISITION METHOD | Auto | Auto | Auto | — | | — |
| DNS ACQUISITION METHOD | Auto | Auto | Auto | — | | — |

700

COMMUNICATION APPARATUS, CONTROL METHOD, AND STORAGE MEDIUM

BACKGROUND

Field of the Disclosure

Aspects of the embodiments generally relate to a communication apparatus capable of performing wireless communication.

Description of the Related Art

In recent years, communication apparatuses are capable of performing data communication with respect to various apparatuses via wireless communication. Japanese Patent Application Laid-Open No. 2011-120279 discusses an electronic camera which selects any one of a server, a personal computer (PC), and a printer, connects to the selected one via a wireless local area network (LAN), and transmits an image thereto.

As one of security protocols in wireless communications using a wireless LAN, there is Wi-Fi Protected Access® (WPA). In WPA, there is a plurality of security methods, and a communication apparatus is capable of performing encrypted communication with another communication apparatus by connecting to an access point according to a security method set in the access point. However, in a case where a user is unfamiliar with security protocols, the user is unable to set an appropriate security method to the communication apparatus and thus may be unable to cause the communication apparatus to connect to the access point.

SUMMARY OF THE DISCLOSURE

According to an aspect of the embodiments, an apparatus includes an operation unit, a display unit, a communication unit, and a control unit, wherein the control unit controls the display unit to display, while indicating together as one item, a plurality of security methods compatible with a first authentication method out of authentication methods in Wi-Fi Protected Access® (WPA), wherein, in response to the item being selected, the control unit causes the operation unit to receive inputting of a password for connecting to an access point, and wherein the control unit varies a security method in WPA used when connecting to the access point based on a format or number of characters of the password.

Further features of the disclosure will become apparent from the following description of exemplary embodiments with reference to the attached drawings.

BRIEF DESCRIPTION OF THE DRAWINGS

FIG. 7 is a diagram illustrating an example of a database of information about APs which is recorded in the image capturing apparatus in the first exemplary embodiment.

DESCRIPTION OF THE EMBODIMENTS

Various exemplary embodiments, features, and aspects of the disclosure will be described in detail below with reference to the drawings.

Furthermore, exemplary embodiments to be described below are merely examples of implementation of the disclosure, and can be modified or altered as appropriate according to configurations of apparatuses to which the disclosure is applied and various conditions thereof. Moreover, some or all of the exemplary embodiments can be combined as appropriate.

<Configuration of Image Capturing Apparatus 100>

Figure 1A:
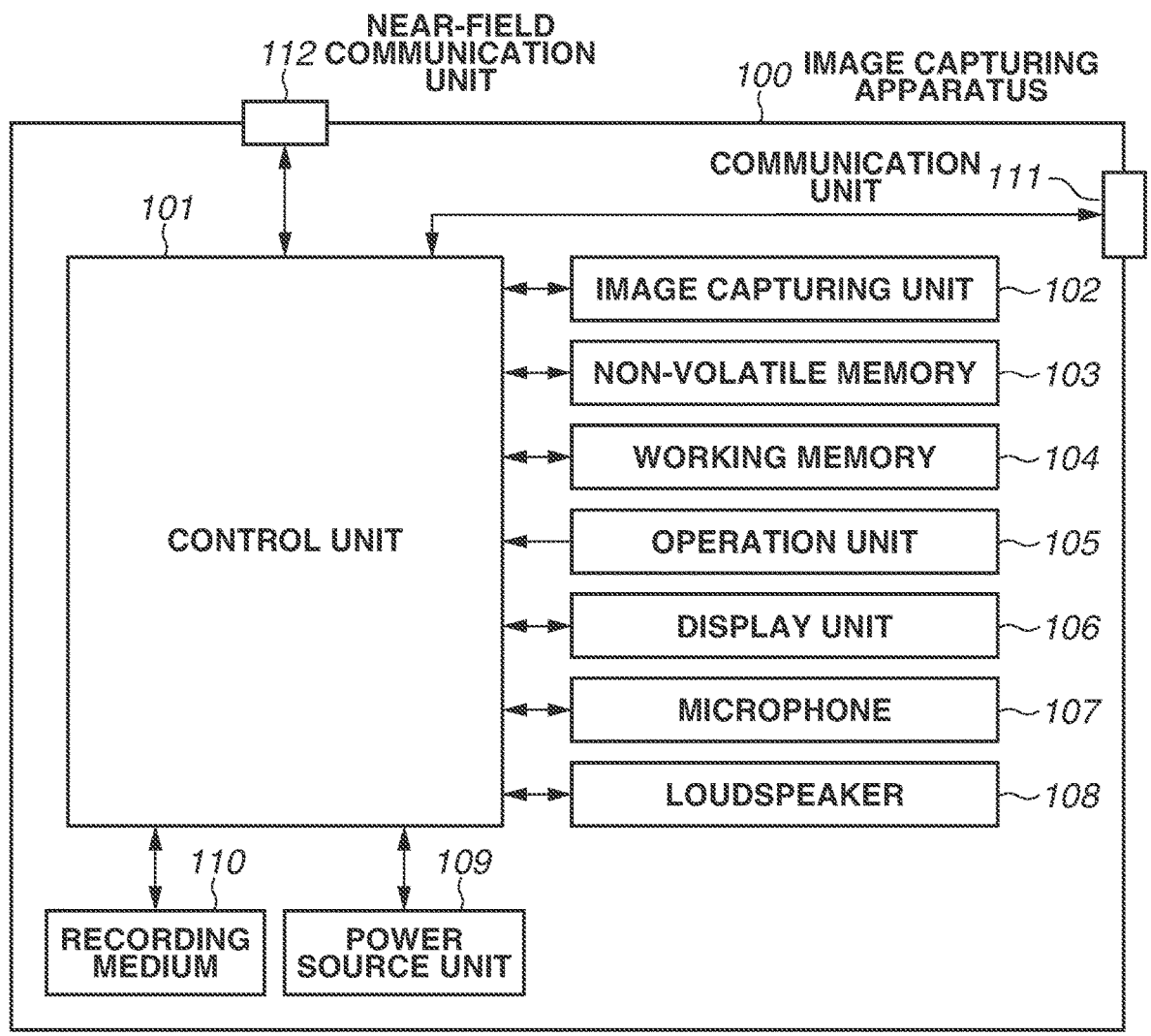
FIG. 1A is a block diagram illustrating an example of a configuration of an image capturing apparatus, which is an example of a communication apparatus in a first exemplary embodiment.

FIG. 1A is a block diagram illustrating an example of a configuration of an image capturing apparatus 100 (for example, a digital camera), which is an example of a communication apparatus in a first exemplary embodiment. While, in the description of the first exemplary embodiment and other exemplary embodiments, the image capturing apparatus 100 is taken as an example of the communication apparatus, the communication apparatus is not limited to the image capturing apparatus 100. For example, the image capturing apparatus 100 can be any type of information processing apparatuses, such as a personal computer (PC), a mobile phone, a smartphone, a tablet computer, a personal digital assistance (PDA), and a portable media player. In the following description, a configuration of the image capturing apparatus 100 is described with reference to FIG. 1A.

A control unit 101 controls constituent elements of the image capturing apparatus 100 according to input signals and a program described below. For example, the control unit 101 includes a processor such as a central processing unit (CPU) or an accelerated processing unit (APU). Furthermore, instead of the control unit 101 controlling the entirety of the image capturing apparatus 100, a plurality of pieces of hardware can control the entirety of the image capturing apparatus 100 in a sharing manner.

An image capturing unit 102 includes an optical system and an image processing unit. For example, the optical system includes a lens unit, and controls, for example, the aperture, zoom, and focus of the lens unit. For example, the image processing unit includes an image sensor for converting light focused on an imaging plane via the lens unit (an optical image of a subject) into an electrical signal, generates still image data or moving image data from the electrical signal generated by the image sensor, and outputs the generated still image data or moving image data. The image sensor to be ordinarily used includes a complementary metal-oxide semiconductor (CMOS) sensor or a charge-coupled device (CCD) sensor. In the first exemplary embodiment, a series of processing for generating image data at the image capturing unit 102 and outputting the generated image data from the image capturing unit 102 is referred to as "image capturing". In the image capturing apparatus 100, image data is recorded on a recording medium 110 described below according to the Design rule for Camera File system (DCF) standard.

A non-volatile memory 103 is an electrically erasable and recordable non-volatile memory, and stores, for example, a program described below, which is to be executed by the control unit 101.

A working memory 104 is used as, for example, a buffer memory for temporarily recording therein image data generated by the image capturing unit 102, an image display memory for a display unit 106, and a working area for the control unit 101. Moreover, the working memory 104 is also used as a buffer memory for temporarily recording therein audio data input from a microphone 107.

An operation unit 105 is a user interface for receiving an instruction issued to the image capturing apparatus 100 from the user. The operation unit 105 includes, for example, a power switch for bringing the power supply of the image capturing apparatus 100 into an on-state or an off-state, a release switch for issuing an instruction for image capturing, a reproduction button for issuing an instruction to reproduce image data, and a switching button for image capturing modes. Additionally, the operation unit 105 can include operation members such as dedicated connection buttons for starting communications with external apparatuses via a communication unit 111 or a near-field communication unit 112. Moreover, a touch panel formed in the display unit 106 can be included in the operation unit 105. Furthermore, the release switch includes switches SW1 and SW2. In response to the release switch entering into what is called a half-pressed state, the switch SW1 is turned on. This results in reception of an instruction for making preparations for image capturing, such as autofocus (AF) processing, automatic exposure (AE) processing, automatic white balance (AWB) processing, and electronic pre-flash (EF) processing. Moreover, in response to the release switch entering into what is called a fully-pressed state, the switch SW2 is turned on. In response to the switch SW2 being turned on, the image capturing apparatus 100 receives an instruction for performing image capturing.

The display unit 106 performs, for example, displaying of captured image data and displaying of characters used for a dialogical operation. In the first exemplary embodiment, the display unit 106 includes a liquid crystal display and an organic electroluminescence (EL) display. Moreover, the control unit 101 is able to cause the display unit 106 to function as an electronic viewfinder by sequentially displaying digital data output from the image capturing unit 102 on the display unit 106 at the time of still image capturing and moving image capturing. This enables the image capturing apparatus 100 to perform through-image displaying (live view displaying (LV displaying))S. Furthermore, the display unit 106 does not necessarily need to be incorporated in the image capturing apparatus 100, but can be configured to be externally connected to the image capturing apparatus 100. The image capturing apparatus 100 is able to connect to an internal or external display unit 106 and to include at least a display control function for controlling a displaying operation of the display unit 106.

The microphone 107 collects sound waves such as voice to generate audio data. At the time of capturing of a moving image with sound, the control unit 101 generates moving image data with sound from audio data generated by the microphone 107 and image data generated by the image capturing unit 102. Moreover, the control unit 101 is able to record image data generated by the image capturing unit 102 while associating the image data with audio data generated by the microphone 107. In the first exemplary embodiment, the microphone 107 is incorporated in the image capturing apparatus 100. Furthermore, processing which the microphone 107 performs to generate audio data from sound waves can be implemented by another piece of hardware (for example, the control unit 101) sharing a part of the processing.

A loudspeaker 108 is an electroacoustic transducer which is capable of reproducing electronic sound. The electronic sound is, for example, music, warning tone, in-focus sound, electronic shutter sound, or operation sound. Moreover, the electronic sound is previously recorded as audio data on the non-volatile memory 103. In the first exemplary embodiment, in response to the control unit 101 outputting audio data to the loudspeaker 108, the loudspeaker 108 reproduces electronic sound. The user hears sound reproduced by the loudspeaker 108, thus being able to become aware that, for example, in-focus has been attained on a subject or an error has occurred in the image capturing apparatus 100.

A power source unit 109, which is controlled by the control unit 101, is able to supply electric power to the respective constituent elements of the image capturing apparatus 100. The power source unit 109 includes a power source (battery) such as a lithium-ion battery or an alkaline manganese dry cell.

The recording medium 110 is able to record thereon, for example, still image data or moving image data output from the image capturing unit 102. The recording medium 110 is, for example, a memory card (for example, a Secure Digital (SD) card or a CompactFlash (CF) card) or an auxiliary recording device (for example, a hard disk drive or a solid state drive). The recording medium 110 can be configured to be attachable to and detachable from the image capturing apparatus 100 or can be incorporated in the image capturing apparatus 100. The image capturing apparatus 100 is to include at least a unit configured to access the recording medium 110.

The communication unit 111 is an interface for connecting to an external apparatus. The image capturing apparatus 100 in the first exemplary embodiment is able to perform transmission and reception of data with respect to an external apparatus via the communication unit 111. For example, the image capturing apparatus 100 is able to transmit image data generated by the image capturing unit 102 to an external apparatus via the communication unit 111. Furthermore, in the first exemplary embodiment, the communication unit 111 includes an interface for performing communication via what is called a wireless local area network (LAN) compliant with the standard of IEEE 802.11 with respect to an external apparatus. The control unit 101 implements communication with an external apparatus by controlling the communication unit 111.

The near-field communication unit 112 is a communication unit configured to implement non-contact short-distance communication with another communication apparatus. The near-field communication unit 112 is configured with, for example, an antenna used for wireless communication, a modulation and demodulation circuit for processing a wireless signal, and a communication controller. The near-field communication unit 112 implements non-contact short-distance communication by outputting a modulated wireless signal from the antenna and demodulating a wireless signal received by the antenna. In the first exemplary embodiment, communications to be performed by the near-field communication unit 112 are compliant with Bluetooth®, which is a communication standard established by the Bluetooth Special Interest Group (Bluetooth SIG). In the first exemplary embodiment, Bluetooth communication employs Bluetooth Low Energy (BLE), which is formulated in version 4.0 and subsequent versions of Bluetooth. This BLE communication is narrower in a range able to be communicated than wireless LAN communication and is lower in communication speed than wireless LAN communication. On the other hand, BLE communication is smaller in power consumption than wireless LAN communication.

In the first exemplary embodiment, the communication speed of a communication which is implemented by the communication unit 111 is higher than the communication speed of a communication which is implemented by the near-field communication unit 112 described below. Moreover, the communication which is implemented by the communication unit 111 is wider in a range able to be communicated than the communication which is implemented by the near-field communication unit 112.

Furthermore, the communication unit 111 of the image capturing apparatus 100 has an access point (hereinafter referred to as "AP") mode, which is a mode of operating as an AP in the infrastructure mode, and a client (hereinafter referred to as "CL") mode, which is a mode of operating as a CL in the infrastructure mode. Then, when causing the communication unit 111 to operate with the CL mode, the image capturing apparatus 100 in the first exemplary embodiment is able to operate as a CL apparatus in the infrastructure mode. When operating as a CL apparatus, the image capturing apparatus 100 is able to connect to a nearby AP apparatus to participate in a network formed by the nearby AP apparatus. Moreover, when causing the communication unit 111 to operate with the AP mode, the image capturing apparatus 100 in the first exemplary embodiment is able to operate as a simplified AP (hereinafter referred to as a "simple AP"), which is one type of AP but is more restricted in function. When the image capturing apparatus 100 operates a simple AP, the image capturing apparatus 100 forms a network by itself. An apparatus located near the image capturing apparatus 100 becomes able to recognize the image capturing apparatus 100 as an AP apparatus and thus participate in the network formed by the image capturing apparatus 100. A program for causing the image capturing apparatus 100 to operate in the above-mentioned way is assumed to be previously stored in the non-volatile memory 103.

Furthermore, the image capturing apparatus 100 in the first exemplary embodiment is one type of AP but is a simple AP which does not have a gateway function for transferring data received from a CL apparatus to, for example, an Internet provider. Accordingly, even when receiving data from another apparatus participating in a network formed by the image capturing apparatus 100, the image capturing apparatus 100 is unable to transfer the received data to a network such as the Internet.

Furthermore, while, in the description of the first exemplary embodiment, since the image capturing apparatus 100 is taken as an example of a communication apparatus, the image capturing unit 102 is included as a constituent element, the communication apparatus does not necessarily need to include the image capturing unit 102.

Figure 1B:
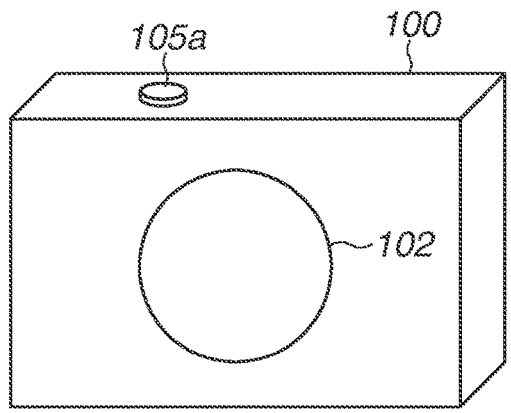
FIGS. 1B and 1C are diagrams illustrating an example of an outer appearance of the image capturing apparatus in the first exemplary embodiment.
Figure 1C:
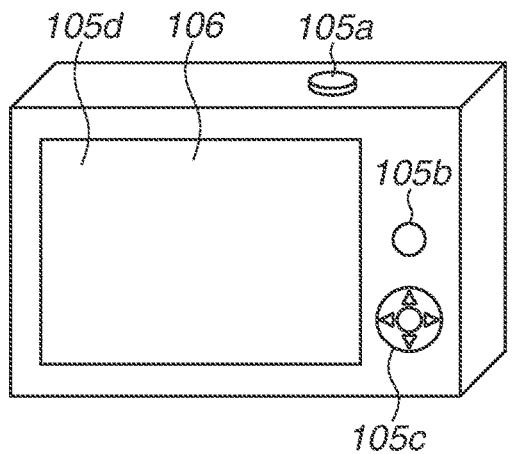

FIGS. 1B and 1C are diagrams illustrating an example of an outer appearance of the image capturing apparatus 100. A release switch 105a, a playback button 105b, direction keys 105c, and a touch panel 105d are operation members included in the operation unit 105. Moreover, the display unit 106 is configured to display image data obtained as a result of image capturing performed by the image capturing unit 102. Moreover, the image capturing apparatus 100 in the first exemplary embodiment is provided with, at a side surface of the camera casing thereof, an antenna portion of the near-field communication unit 112. Near-field wireless communication with a different apparatus is able to be established by bringing the near-field communication unit 112 and the different apparatus close to each other within a predetermined distance. This enables performing communication in a non-contact manner without via, for example, a cable and restricting a communication partner according to the intention of the user.

Thus far is the description of an example of a configuration of the image capturing apparatus 100.

<Connection Configuration Between Image Capturing Apparatus 100 and AP 200>

Figure 2:
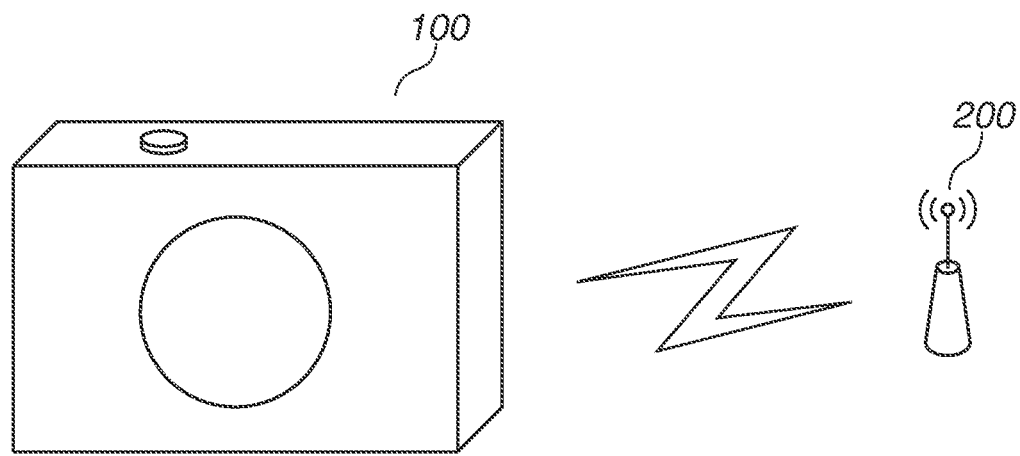
FIG. 2 is a diagram illustrating an example of a connection configuration between the image capturing apparatus in the first exemplary embodiment and an access point (AP).

A connection configuration between the image capturing apparatus 100 in the first exemplary embodiment and an AP 200 is described with reference to FIG. 2. The AP 200 is, for example, a router. FIG. 2 is a diagram schematically illustrating a connection configuration between the image capturing apparatus 100 in the first exemplary embodiment and the AP 200. The image capturing apparatus 100 controls the communication unit 111 to participate in a wireless LAN network which the AP 200 forms. The image capturing apparatus 100 performs connection processing including authentication processing with respect to the AP 200, thus entering into a state of being able to transmit and receive data. Furthermore, the AP 200 is not limited to an AP apparatus such as a router, but can be an apparatus having an AP function, such as a smartphone having a tethering function.

Usually, there are following two procedures for the image capturing apparatus 100 to connect to an AP. One is a procedure in which the image capturing apparatus 100 receives a beacon signal emitted from the AP, acquires, for example, a service set identifier (SSID) and a security method from information included in the received beacon signal, and transmits a connection request to the AP based on the acquired information. The other is a procedure (what is called a manual connection) in which an SSID and a security method are previously set in the image capturing apparatus 100 by the user and the image capturing apparatus 100 transmits a connection request to the AP without receiving a beacon signal based on the set SSID and security method. In the former procedure, the user is able to cause the image capturing apparatus 100 and the AP to connect to each other without knowing detailed settings of the AP, but is required to input, for example, a password to the image capturing apparatus 100 after arriving at a place where the image capturing apparatus 100 is able to receive a beacon signal from the AP. On the other hand, in the latter procedure, since the user previously sets, for example, an SSID, a security method, and a password to the image capturing apparatus 100, the user is able to cause the image capturing apparatus 100 and the AP to connect to each other immediately after arriving at a place where the image capturing apparatus 100 is able to connect to the AP. In such a latter procedure, operations of the user required until the image capturing apparatus 100 connects to the AP are relatively fewer than those in the former procedure, so that it is possible to cause the image capturing apparatus 100 and the AP to quickly connect to each other. However, in the latter procedure, since the user is required to set, to the image capturing apparatus 100 in advance, the same security method as a security method which an AP to which the user intends to cause the image capturing apparatus 100 to connect uses, the user is to have knowledge of security methods.

<Authentication Processing>

Prior to the description of connection processing, a security protocol called Wi-Fi Protected Access® (WPA), which is used in authentication processing to be performed between the image capturing apparatus 100 and the AP 200 in the first exemplary embodiment, is described.

WPA has a plurality of security methods, i.e., three security methods, WPA, WPA2, and WPA3 in chronological order of formulation. In these security methods, the newer is higher in security strength. Thus, WPA3, which is the newest, is a method higher in security strength than WPA and WPA2.

Moreover, the security protocol WPA has two authentication methods, i.e., a "Personal" authentication method and an "Enterprise" authentication method. In the "Personal" authentication method, authentication processing using a pre-shared key (PSK) is performed. For example, in the "Personal" authentication method, authentication processing is performed with use of a previously determined password. Moreover, in the "Enterprise" authentication method, authentication processing compliant with the IEEE 802.1X standard is performed. For example, in the "Enterprise" authentication method, authentication processing using a certificate provided by an authentication server (for example, a RADIUS server) is performed.

In the first exemplary embodiment, the image capturing apparatus 100 and the AP 200 perform authentication processing while using the above-mentioned security method and authentication method in combination with each other. Hereinafter, a combination of the security method and authentication method set to the image capturing apparatus 100 or the AP 200 is set forth in the order of a security method to an authentication method, such as "WPA2-Personal".

Figure 3:
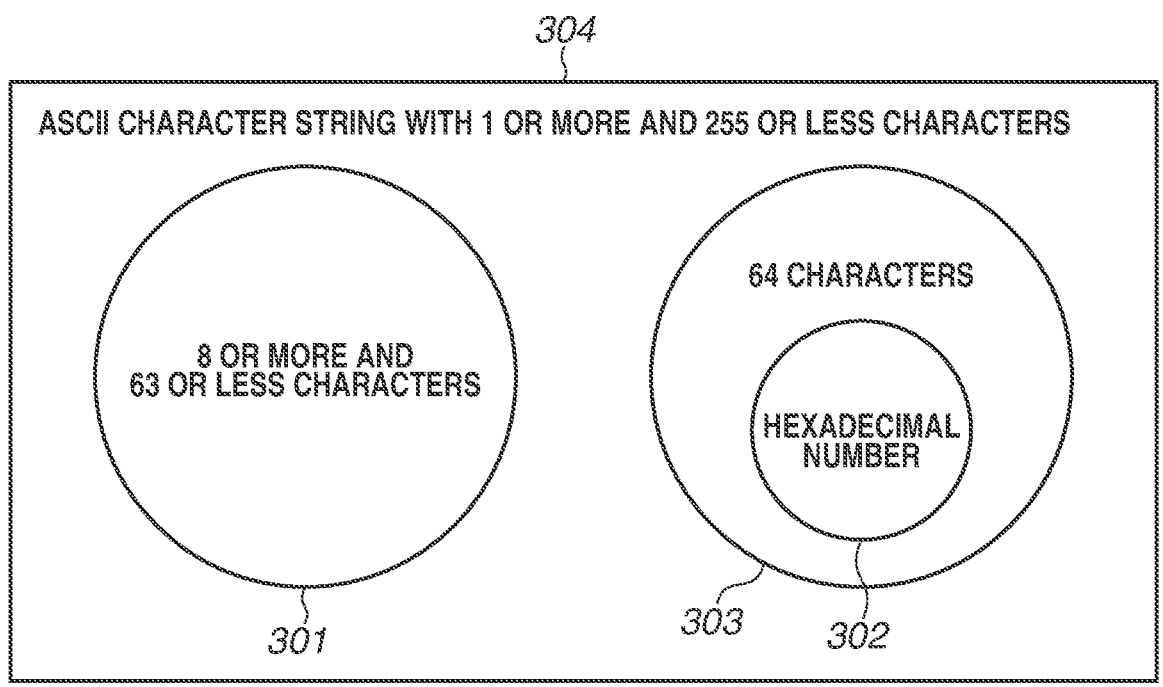
FIG. 3 is a diagram illustrating conditions for a password which is able to be used in a "Personal" mode, which is an authentication method for a Wi-Fi Protected Access® (WPA) program in the first exemplary embodiment.

Here, conditions for a password which is used in the "Personal" authentication method are described with reference to FIG. 3. In the security protocol for WPA, conditions for passwords which are used in WPA and WPA2 are in common, and a condition for a password which is used in WPA3 is different from those in WPA and WPA2. FIG. 3 is a Venn diagram for visually showing such conditions for a password. Furthermore, in FIG. 3, each of a region 301, a region 302, a region 303, and a region 304 is illustrated as a region which does not have a region overlapping each other. For example, the region 303 is illustrated as a region which does not include the region 302. For example, the region 304 is illustrated as a region which does not include the region 301, the region 302, and the region 303.

A password able to be used in each of WPA and WPA2 is an ASCII character string with 8 or more and 63 or less characters (a condition included in the region 301) and a hexadecimal number with 64 characters (a condition included in the region 302). On the other hand, a password able to be used in WPA3 is an ASCII character string with 1 or more and 255 or less characters (conditions included in the region 301, the region 302, the region 303, and the region 304). Thus, a condition for a password able to be used in WPA3 can be any of all of the conditions illustrated in FIG. 3.

Since, in this way, the condition for a password in WPA and WPA2 and the condition for a password in WPA3 are different from each other, there is a condition for a password which is unable to be used in WPA and WPA2 and is able to be used only in WPA3. Thus, in WPA and WPA2, a password which is an ASCII character string having 64 characters but not being a hexadecimal number (a condition included in the region 303) is not able to be used. Moreover, in WPA and WPA2, a password which is an ASCII character string having 1 or more and 7 or less characters or 65 or more and 255 or less characters (a condition included in the region 304) is not able to be used.

Thus far is the description of conditions for a password which is used in the "Personal" authentication method. Furthermore, in the "Enterprise" authentication method, Conditions for a password such as those described above are not formulated.

Here, a method for determining a security method which is used in authentication processing for WPA is described. The image capturing apparatus 100 and the AP 200 have a plurality of modes for determining a security method. Hereinafter, modes for determining a security method are referred to as "selection modes". The selection modes include "WPA only", "WPA2 only", "WPA3 only", "WPA/WPA2 mixed", "WPA/WPA3 mixed", "WPA2/WPA3 mixed", and "WPA/WPA2/WPA3 mixed" modes.

The "WPA only", "WPA2 only", and "WPA3 only" modes are described. Each of these modes is a mode for determining only one security method as a method to be used for authentication processing. For example, in the "WPA3 only" mode, only a security method for WPA3 is determined as a method to be used for authentication processing. Hereinafter, these three modes are collectively referred to as an "only mode".

The "WPA/WPA2 mixed", "WPA/WPA3 mixed", "WPA2/WPA3 mixed", and "WPA/WPA2/WPA3 mixed" modes are described. Each of these modes is a mode for selectively determining which of a plurality of security methods to use for authentication processing. For example, the "WPA2/WPA3 mixed" mode is a mode for selectively determining which of two security methods for WPA2 and WPA3 as a method to be used for authentication processing. Moreover, the "WPA/WPA2/WPA3 mixed" mode, which is one of the mixed modes, is a mode for selectively determining which of three security methods for WPA, WPA2, and WPA3 as a method to be used for authentication processing. Hereinafter, these four modes are collectively referred to as a "mixed mode".

When causing the image capturing apparatus 100 and the AP 200 to connect to each other by a procedure for manual connection, the user is to determine a selection mode for the image capturing apparatus 100 in conformity with the selection mode of the AP 200. This is because, after the AP 200 determines a selection mode and then forms a network, the image capturing apparatus 100 participates in the formed network.

In a case where the AP 200 forms a network in the only mode, to cause the image capturing apparatus 100 to participate in the network by a procedure for manual connection, the user is to set a selection mode corresponding to the security method of the AP 200 to the image capturing apparatus 100. For example, in a case where the selection mode "WPA3 only" is currently set to the AP 200, the user is to set, for example, the "WPA3 only" or "WPA2/WPA3 mixed" mode to the image capturing apparatus 100 as the selection mode of the image capturing apparatus 100.

Moreover, in a case where the AP 200 forms a network in the mixed mode, to cause the image capturing apparatus 100 to participate in the network by a procedure for manual connection, the user is to set a selection mode corresponding to a security method included in the selection mode of the AP 200 to the image capturing apparatus 100. For example, in a case where the selection mode "WPA2/WPA3 mixed" is currently set to the AP 200, the user is to set, for example, the "WPA2 only" or "WPA/WPA2/WPA3 mixed" mode to the image capturing apparatus 100 as the selection mode of the image capturing apparatus 100.

Furthermore, in a case where both the image capturing apparatus 100 and the AP 200 are in the mixed mode, a security method which is highest in security strength among the security methods which are in common with each other is used for communication between the image capturing apparatus 100 and the AP 200.

Furthermore, the mixed mode results in corresponding to any one of at least WPA and WPA2. Therefore, in the mixed mode, a condition for a password able to be used is limited to a condition included in the region 301 or a condition included in the region 302. In other words, a password which satisfies a condition included in the region 303 or a condition included in the region 304 is not able to be used for the mixed mode. This is because, since, in the mixed mode, a security method is automatically determined, a password is required to be able to be used for a plurality of security methods in common. Thus, a password which satisfies a condition included in the region 303 or a condition included in the region 304 is a password which is able to be used for only the "WPA3 only" mode.

Furthermore, in the "Enterprise" authentication method, since, as mentioned above, conditions for a password are not formulated, a condition for a password does not vary depending on security methods.

Setting an appropriate selection mode to the image capturing apparatus 100 and the AP 200 in the above-mentioned way to perform authentication processing enables causing the image capturing apparatus 100 and the AP 200 to wirelessly connect to each other.

Thus far is the description of a method for selecting a security method in authentication processing.

As mentioned above, to cause the image capturing apparatus 100 and the AP 200 to connect to each other by a procedure of manual connection, the user is to set an appropriate selection mode out of the above-mentioned plurality of selection modes to the image capturing apparatus 100. However, there is an issue in which a user who is unfamiliar with WPA does not know which selection mode is an optimum selection mode. Particularly, in the case of a menu display in which options for a security method presented by an apparatus intended to connect to an AP are not completely consistent with setting of the AP serving as a connection destination, a user who is unfamiliar with WPA may be unable to select an appropriate option. For example, there is a case where, while an AP uses the selection mode "WPA3 only", a plurality of items including WPA3, such as "WPA2/WPA3 mixed" and "WPA3 only", is displayed in a menu displayed in an apparatus intended to connect to the AP. In such a case, a user who is unfamiliar with WPA may not know which is to be selected, thus being confused.

If a wrong item has been selected, the following inconvenience may occur. Thus, since there are passwords which are not able to be used in the mixed mode as mentioned above, in a case where the selection mode "WPA2/WPA3 mixed" has been set in an apparatus intended to connect to an AP, there is a case in which the apparatus is unable to connect to the AP.

For example, in a case where a password which an AP serving as a connection destination uses satisfies the condition 303 or the condition 304, the user is to set the selection mode "WPA3 only" to an apparatus intended to connect to the AP. However, if the user has selected the selection mode "WPA2/WPA3 mixed" by mistake, the apparatus may be unable to connect to the AP. There can be considered the following two cases in which the apparatus is unable to connect to the AP.

The first case is a case where a control unit of the apparatus intended to connect to the AP limits the number of characters or character code of a password which the user is allowed to input to only a password which satisfies the condition for passwords common to both WPA2 and WPA3. In this case, the user is not allowed to input a password which is able to be used only in WPA3 to the apparatus intended to connect to the AP. Thus, in a case where the AP is using a password which is able to be used only in WPA3, the user is not able to input the password to the apparatus intended to connect to the AP, so that, as a result, the apparatus is unable to connect to the AP.

The second case is a case where a control unit of the apparatus intended to connect to the AP accepts only a password which satisfies the condition for passwords common to both WPA2 and WPA3. In this case, even if the user has been able to input a password which is able to be used only in WPA3 to the apparatus intended to connect to the AP, the apparatus intended to connect to the AP does not transmit a connection request to the AP.

In such a case, since the AP serving as a connection destination is using a password which is able to be used only in WPA3, the user may be unable to cause the apparatus intended to connect to the AP to connect to the AP.

Setting a security method in consideration of the above-mentioned things is an extremely high hurdle for ordinary users and conspicuously lacks usability. Therefore, in the first exemplary embodiment, the image capturing apparatus 100 is configured to be able to connect to the AP 200 without the user becoming conscious of an appropriate selection mode. Operations for that purpose are described as follows.

<Connection Processing to be Performed Between Image Capturing Apparatus 100 and AP 200>

Processing which the image capturing apparatus 100 performs to connect to a network such as a wireless LAN which the AP 200 forms is described with reference to FIGS. 4A, 4B, 4C, 4D, and 4E and FIG. 5.

Figure 4A:
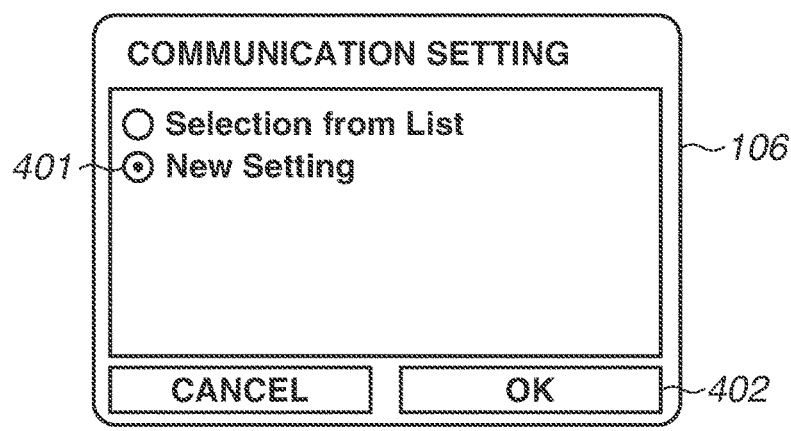
FIG. 4A is a diagram illustrating an example of a "communication setting" screen, which is displayed in the image capturing apparatus in the first exemplary embodiment.
Figure 4B:
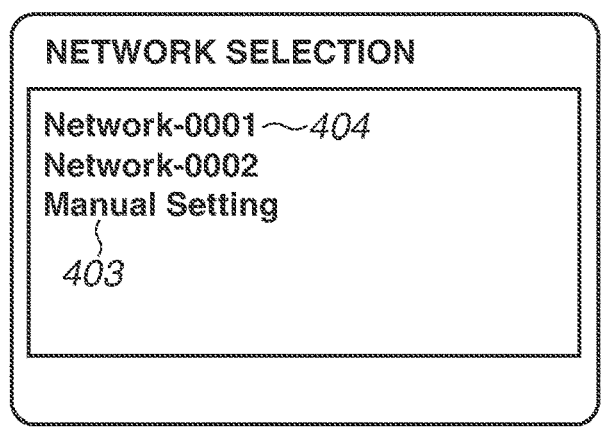
FIG. 4B is a diagram illustrating an example of a "network selection" screen, which is displayed in the image capturing apparatus in the first exemplary embodiment.
Figure 4C:
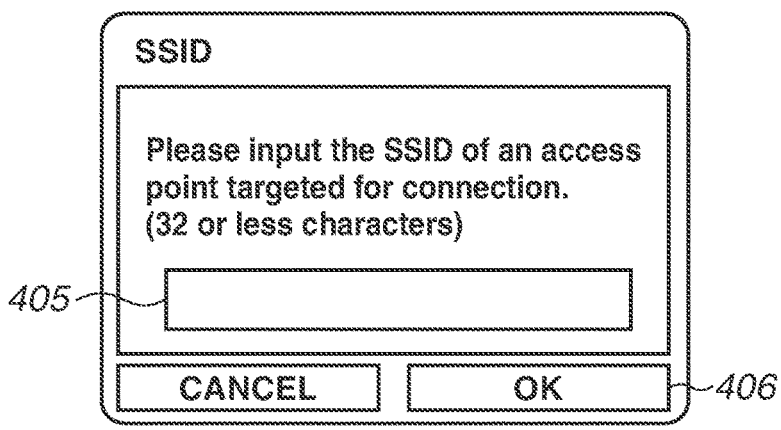
FIG. 4C is a diagram illustrating an example of a "service set identifier (SSID)" screen, which is displayed in the image capturing apparatus in the first exemplary embodiment.
Figure 4D:
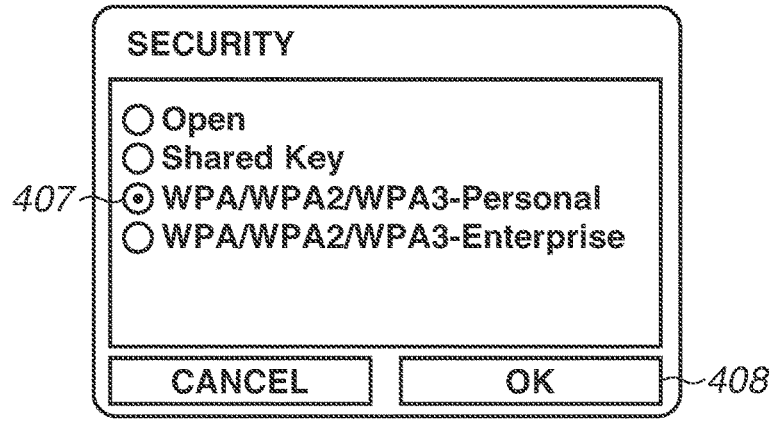
FIG. 4D is a diagram illustrating an example of a "security" screen, which is displayed in the image capturing apparatus in the first exemplary embodiment.
Figure 4E:
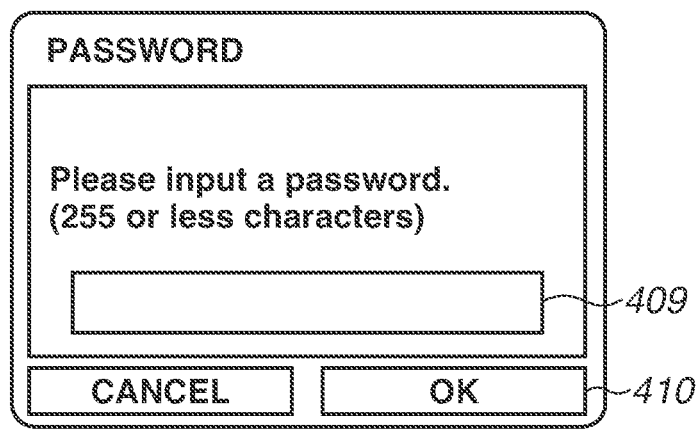
FIG. 4E is a diagram illustrating an example of a "password" screen, which is displayed in the image capturing apparatus in the first exemplary embodiment.
Figure 5:
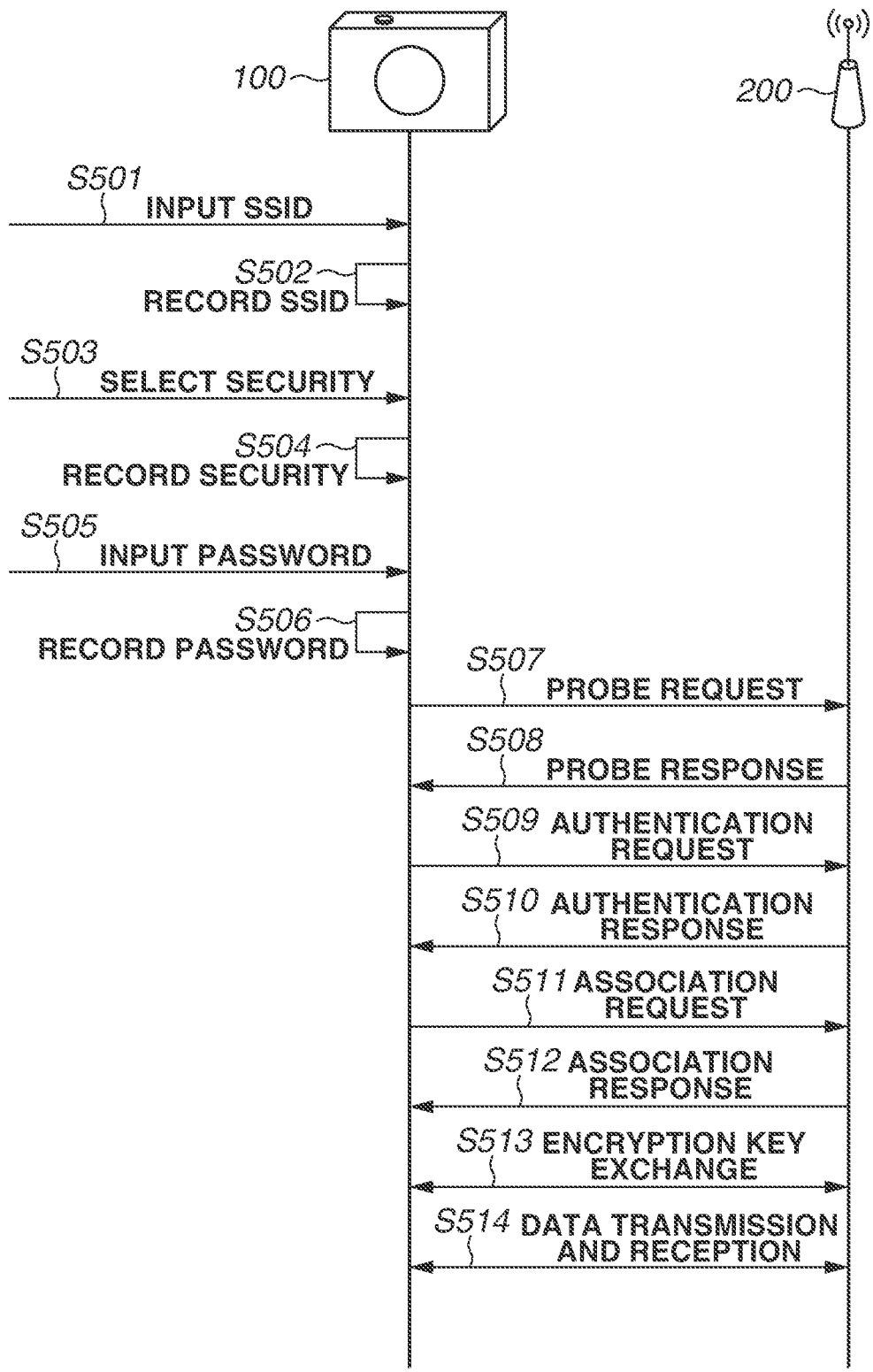
FIG. 5 is a sequence diagram illustrating an example of connection processing which is performed between the image capturing apparatus in the first exemplary embodiment and the AP.

FIGS. 4A to 4E are diagrams illustrating examples of screens each of which is displayed on the display unit 106 of the image capturing apparatus 100. FIG. 5 is a sequence diagram illustrating an example of a procedure which is performed until the image capturing apparatus 100 completes connection to the AP 200. A series of procedure illustrated in FIG. 5 is started by being triggered by an item 403 for "manual setting" being selected in a "network selection" screen illustrated in FIG. 4B. Furthermore, the screen illustrated in FIG. 4B is displayed in response to an item 401 for "new setting" being selected and an OK button 402 being selected via the operation unit 105 in a "communication setting" screen illustrated in FIG. 4A. The screen illustrated in FIG. 4A is able to be displayed in response to the communication setting being selected in a menu displayed in the image capturing apparatus 100. Furthermore, in the description of the present sequence, the "Personal" authentication method is assumed to be previously set as an authentication method in the AP 200.

In step S501, the user inputs, to the image capturing apparatus 100, an SSID of a network which the AP 200 forms. For example, the user inputs an SSID of a network which the AP 200 forms to an entry field 405 displayed in an "SSID" screen illustrated in FIG. 4C via the operation unit 105, and then selects an OK button 406.

In step S502, the image capturing apparatus 100 records the SSID input in step S501 as an SSID of a network which an AP forms.

In step S503, the user selects security to be set to the image capturing apparatus 100. In the first exemplary embodiment, the user selects a security method and an authentication method. For example, the user selects "WPA/WPA2/WPA3-Personal" from items displayed in a "security" screen illustrated in FIG. 4D, and then selects an OK button 408. Here, in the image capturing apparatus 100 in the first exemplary embodiment, the image capturing apparatus 100 is configured to display WPA, WPA2, and WPA3 together as one item as illustrated in FIG. 4D. Thus, with respect to the "Personal" authentication method, the image capturing apparatus 100 does not display any item for the selection mode. This enables the user to, when selecting the "Personal" authentication method, select a security method without becoming conscious of the selection mode.

In step S504, the image capturing apparatus 100 records the security method and the authentication method selected in step S503 as a security method and an authentication method to be used for connection to an AP.

In step S505, the user inputs, to the image capturing apparatus 100, a password for a network which the AP 200 forms. For example, the user inputs a password to an entry field 409 displayed in a "password" screen illustrated in FIG. 4E via the operation unit 105, and then selects an OK button 410.

In step S506, the image capturing apparatus 100 records the password input in step S505 as a password to be used for connection to an AP. Here, the image capturing apparatus 100 determines the selection mode according to the input password. Determination processing for the selection mode which is performed by the image capturing apparatus 100 is described below with reference to FIG. 6.

In step S507, the image capturing apparatus 100 emits a probe request to a nearby AP.

Thus, the image capturing apparatus 100 broadcasts a probe request. The probe request includes information about the SSID and the security method input by the user. The AP 200 receives the probe request, and determines that the received probe request is a probe request directed to a network formed by the AP 200, based on the SSID and the security method included in the probe request.

In step S508, the AP 200 transmits a probe response to the image capturing apparatus 100.

The image capturing apparatus 100 recognizes the presence of the AP 200 by receiving the probe response. The probe response includes information about an SSID of the AP 200, a security method able to be used, and channels.

Furthermore, a method in which, in the above-mentioned way, the image capturing apparatus 100 recognizes an AP by receiving, from the AP, a probe response transmitted in response to a probe request emitted by the image capturing apparatus 100 is referred to as "active scan". On the other hand, a method in which the image capturing apparatus 100 recognizes an AP by receiving a beacon signal which the AP periodically emits is referred to as "passive scan". The image capturing apparatus 100 can employ any one of active scan and passive scan. In a case where active scan is employed, the image capturing apparatus 100 advances the processing to step S509 in response to receiving a probe response. In a case where passive scan is employed, the image capturing apparatus 100 determines whether information included in the beacon signal is consistent with a previously set SSID and security method, and, if these pieces of information are consistent with each other, advances the processing to step S509.

In step S509, the image capturing apparatus 100 transmits an authentication request to the AP 200. The AP 200 receives the authentication request transmitted from the image capturing apparatus 100.

In step S510, the AP 200 transmits an authentication response to the image capturing apparatus 100. The image capturing apparatus 100 receives the authentication response transmitted from the AP 200.

In step S511, the image capturing apparatus 100 transmits an association request to the AP 200, thus requesting connection.

In step S512, the AP 200 transmits, to the image capturing apparatus 100, an association response including information for notifying the image capturing apparatus 100 of the permission of connection or the denial of connection. In the present sequence, the AP 200 transmits an association response including information for notifying the image capturing apparatus 100 of the permission of connection. The image capturing apparatus 100 receives the association response transmitted from the AP 200.

In step S513, the image capturing apparatus 100 and the AP 200 exchange their encryption keys. An encryption key is generated from a password previously recorded in each apparatus. Since a password is used to generate an encryption key, in a case where the password recorded in the image capturing apparatus 100 in step S506 coincides with a password previously set in the AP 200, this means that the same encryption key is generated in these apparatuses. In this case, the image capturing apparatus 100 and the AP 200 are successful in authentication of encryption keys, so that connection is completed. Furthermore, in a case where the password recorded in the image capturing apparatus 100 in step S506 differs from a password previously set in the AP 200, the same encryption key is not generated, so that the image capturing apparatus 100 and the AP 200 are unsuccessful in authentication of encryption keys. In this case, the image capturing apparatus 100 and the AP 200 do not establish wireless connection.

In step S514, the image capturing apparatus 100 and the AP 200 start transmission and reception of data.

Thus far is the description of a series of procedure in which the image capturing apparatus 100 participates in a network such as a wireless LAN which the AP 200 forms.

<Connection Processing to be Performed by Image Capturing Apparatus 100>

Figure 6:
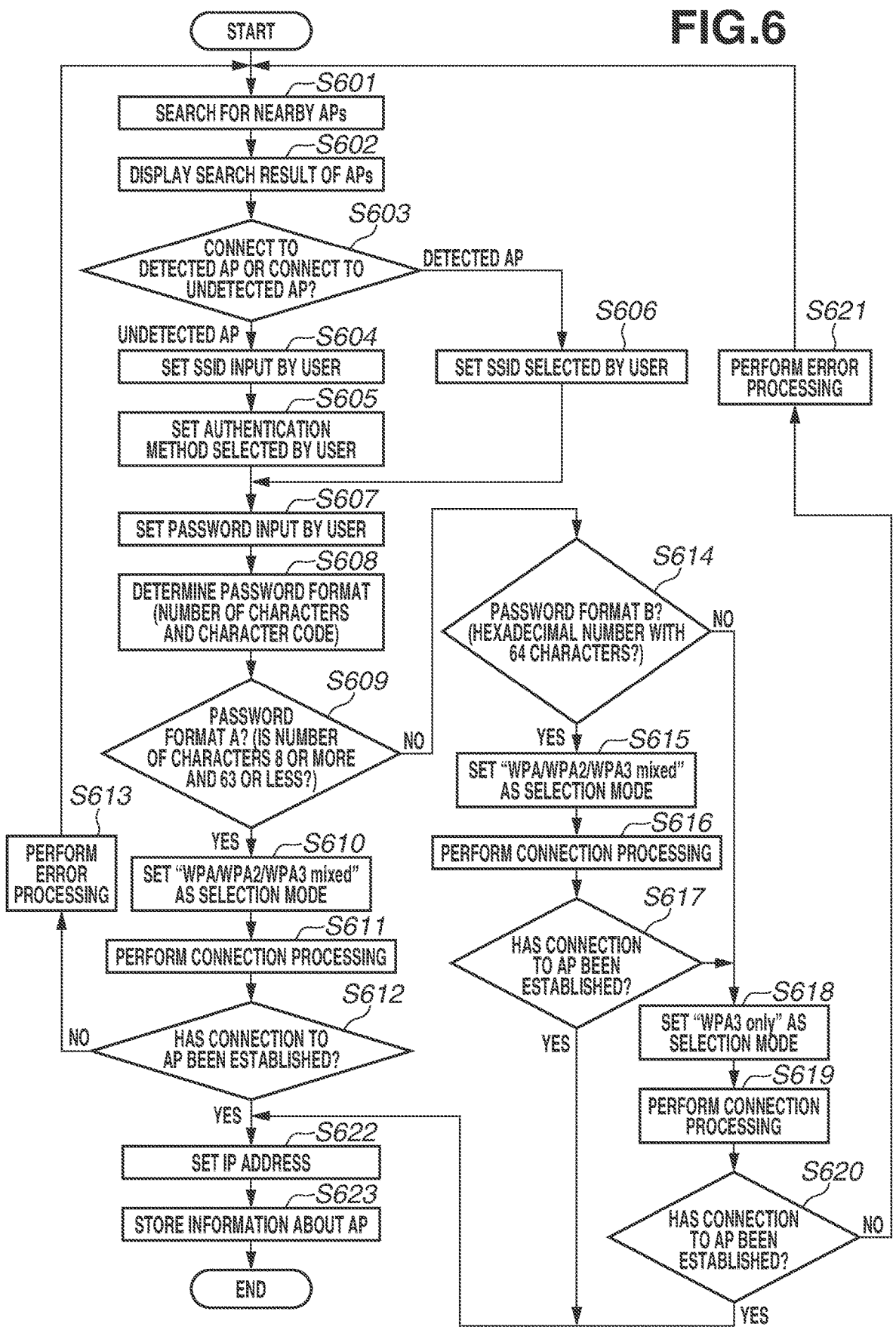
FIG. 6 is a flowchart illustrating an example of connection processing which the image capturing apparatus in the first exemplary embodiment performs with respect to the AP.

Processing which the image capturing apparatus 100 performs to connect to an AP is described with reference to FIGS. 4A to 4G and FIG. 6. FIG. 6 is a flowchart illustrating an example of processing which the image capturing apparatus 100 performs to connect to an AP. Processing illustrated in the present flowchart is implemented by the control unit 101 of the image capturing apparatus 100 controlling various units of the image capturing apparatus 100 according to input signals and a program. Moreover, processing illustrated in the flowchart of FIG. 6 is started by, in the "communication setting" screen illustrated in FIG. 4A, the item 401 for "new setting" being selected and the OK button 402 being then selected via the operation unit 105 by a menu operation of the user. Each processing operation in the present flowchart is implemented by the control unit 101 loading a program stored in the non-volatile memory 103 onto the working memory 104 and then executing the program. Furthermore, in the description of the present flowchart, the "Personal" authentication method is assumed to be previously set in the AP 200.

In step S601, the control unit 101 controls the communication unit 111 to search for APs located near the image capturing apparatus 100. Here, when having detected an AP, the control unit 101 records information about the detected AP in the working memory 104. Information about an AP is information about, for example, an SSID of a network which the AP forms, a compatible security method, a cipher type, and a channel.

In step S602, the control unit 101 controls the display unit 106 to display a search result of APs obtained in step S601. For example, the control unit 101 reads information about APs recorded in the working memory 104, and displays a list of SSIDs of networks which the APs form on the display unit 106, such as an items 404 illustrated in FIG. 4B. Additionally, the control unit 101 displays, in addition to the information about APs, an item for manually connecting to an AP which has not been detected in step S601, such as an item 403 for "manual setting" illustrated in FIG. 4B.

In step S603, the control unit 101 determines whether to connect to an AP which has been detected in step S601 or connect to an AP which has not been detected in step S601. For example, the control unit 101 determines whether manual setting has been selected by the user as a connection method for an AP. If it is determined to connect to an AP which has not been detected in step S601 (UNDETECTED AP in step S603), the control unit 101 advances the processing to step S604. This case is equivalent to a case where, for example, the item 403 has been selected in the screen illustrated in FIG. 4B. If it is determined to connect to an AP which has been detected in step S601 (DETECTED AP in step S603), the control unit 101 advances the processing to step S606. This case is equivalent to a case where, for example, the item 404 has been selected in the screen illustrated in FIG. 4B.

First, a case where the control unit 101 has determined to connect to an AP which has not been detected in step S601 is described.

In step S604, the control unit 101 receives inputting of an SSID input by the user via the operation unit 105. For example, the control unit 101 displays, on the display unit 106, a screen for receiving inputting of an SSID, as illustrated in FIG. 4C. Then, the control unit 101 records, in the working memory 104, the SSID input by the user as an SSID of the AP targeted for connection. Furthermore, in the first exemplary embodiment, the control unit 101 limits the number of characters allowed to be input to the entry field 405 to 1 or more and 32 or less and thus does not accept inputting of 33 or more characters. Moreover, when the OK button 406 has been selected, the control unit 101 determines that an input operation of the user has been completed and records, in the working memory 104, the SSID input by the user as an SSID of the AP targeted for connection. Furthermore, processing in the present step is equivalent to processing in step S501 and S502 illustrated in FIG. 5.

In step S605, the control unit 101 receives inputting of a security method and an authentication method input by the user via the operation unit 105. For example, the control unit 101 displays, on the display unit 106, a screen for selecting a security method and an authentication method, as illustrated in FIG. 4D. Then, the control unit 101 records the security method and the authentication method selected by the user in the working memory 104. In the description of the first exemplary embodiment, the user is assumed to use the "Personal" authentication method as an authentication method. In the first exemplary embodiment, the control unit 101 displays only one item for "WPA/WPA2/WPA3-Personal" (item 407) as an item for selecting the "Personal" authentication method. Since, in this way, only one item is displayed as an item for the "Personal" authentication method, even when using any one of WPA, WPA2, and WPA3, the user is to select "WPA/WPA2/WPA3-Personal". Therefore, even if being unfamiliar with WPA, the user is able to select an appropriate security method. Additionally, the user is also able to decrease the trouble of checking a security method currently set in the AP 200. When the OK button 408 has been selected, the control unit 101 determines that a selection operation of the user has been completed and thus records the authentication method "WPA/WPA2/WPA3-Personal" selected by the user in the working memory 104. Furthermore, processing in the present step is equivalent to processing in step S503 and S504 illustrated in FIG. 5.

Next, a case where the control unit 101 has determined to connect to an AP which has been detected in step S601 is described.

In step S606, the control unit 101 records, in the working memory 104, information about an AP having the SSID selected by the user in step S603 out of pieces of information about APs detected in step S601, as information about an AP targeted for connection. Here, data to be recorded as information about the AP includes information about an SSID, a security method, an authentication method, a cipher type, and a channel.

In step S607, the control unit 101 receives inputting of a password input by the user via the operation unit 105. For example, the control unit 101 displays a screen for receiving inputting of a password on the display unit 106, as illustrated in FIG. 4E. Here, the control unit 101 limits a character string allowed to be input to the entry field 409 to an ASCII character string with 1 or more and 255 or less characters, and thus does not accept inputting of 256 or more characters. Then, the control unit 101 records, in the working memory 104, the password input by the user as a password to be used for connection to an AP. When the OK button 410 has been selected, the control unit 101 determines that an input operation of the user has been completed, and records, in the working memory 104, the password input by the user as a password to be used for connection to an AP targeted for connection. Furthermore, processing in the present step is equivalent to processing in step S505 and S506 illustrated in FIG. 5.

Upon completion of the above-mentioned steps, the SSID, security method, authentication method, and password of the AP targeted for connection have been recorded in the working memory 104. Next, processing which the control unit 101 performs to determine a selection mode is described.

In step S608, the control unit 101 determines the format of the password recorded in the working memory 104 in step S607 in the following way. In the first exemplary embodiment, the control unit 101 determines the format of a password based on the number of characters and character code of the password. Hereinafter, a combination of the number of characters and character code of the password is referred to as a password format.

In a case where the password is a character string with 8 or more and 63 or less characters: Password format A In a case where the password is a character string with 64 characters and being a hexadecimal number: Password format B In a case where the password is a character string with 64 characters and not being a hexadecimal number: Password format C In a case where the password is a character string with 1 or more and 7 or less characters: Password format C In a case where the password is a character string with 65 or more and 255 or less characters: Password format C The password format A is equivalent to the condition 301 illustrated in FIG. 3. The password format B is equivalent to the condition 302 illustrated in FIG. 3. The password format C is equivalent to the condition 303 or the condition 304 illustrated in FIG. 3. The control unit 101 records a result of the above-mentioned determination regarding the password in the working memory 104.

In step S609, the control unit 101 determines whether the password format recorded in the working memory 104 in step S608 is the password format A. Thus, the control unit 101 determines whether the password is a character string with 8 or more and 63 or less characters. If it is determined that the recorded password format is the format A (YES in step S609), the control unit 101 advances the processing to step S610. If it is determined that the recorded password format is not the format A (NO in step S609), the control unit 101 advances the processing to step S614.

First, a case where, in step S609, it is determined that the recorded password format is the format A is described.

In step S610, the control unit 101 sets "WPA/WPA2/WPA3 mixed" as a selection mode. The control unit 101 records, in the working memory 104, information indicating that "WPA/WPA2/WPA3 mixed" has been set as a selection mode.

In step S611, the control unit 101 controls the communication unit 111 to perform connection processing with respect to the AP with use of the selection mode set in step S610. Here, the control unit 101 uses the SSID recorded in step S604 or step S606, the password recorded in step S607, and the security method and authentication method recorded in step S610. In the present step, since the selection mode is "WPA/WPA2/WPA3 mixed", the control unit 101 performs connection processing with respect to the AP with use of any one of security methods WPA, WPA2, and WPA3. In a case where connection to the AP has been established, processing in the present step is equivalent to processing in step S507 to step S513 illustrated in FIG. 5. Furthermore, for example, a case where the control unit 101 fails in establishment of connection to the AP includes, for example, the following three cases:

a case where an AP having the same SSID as the SSID recorded in the working memory 104 in step S604 or step S606 is not detected at the time of connection processing;

a case where the password recorded in the working memory 104 in step S607 is different from a password recorded in the AP; and a case where the selection mode recorded in the working memory 104 in step S610 is inappropriate.

In step S612, the control unit 101 determines whether connection to the AP has been established in the connection processing performed in step S611. If it is determined that connection to the AP 200 has been established (YES in step S612), the control unit 101 advances the processing to step S622. If it is determined that establishment of connection to the AP 200 has failed (NO in step S612), the control unit 101 advances the processing to step S613. Furthermore, processing in step S622 is described below.

Figure 4F:
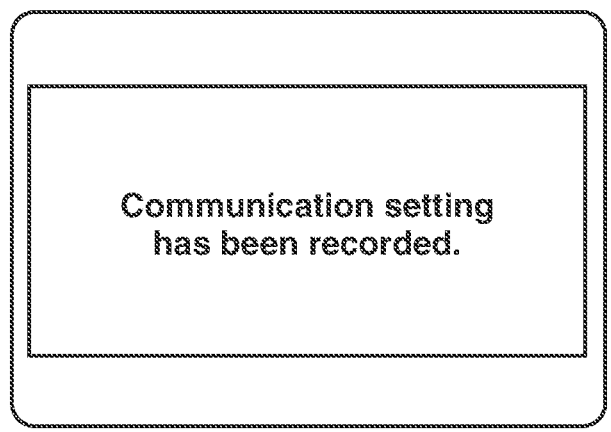
FIG. 4F is a diagram illustrating an example of a screen used for issuing a notification indicating that information about an AP which is displayed in the image capturing apparatus in the first exemplary embodiment has been recorded.
Figure 4G:
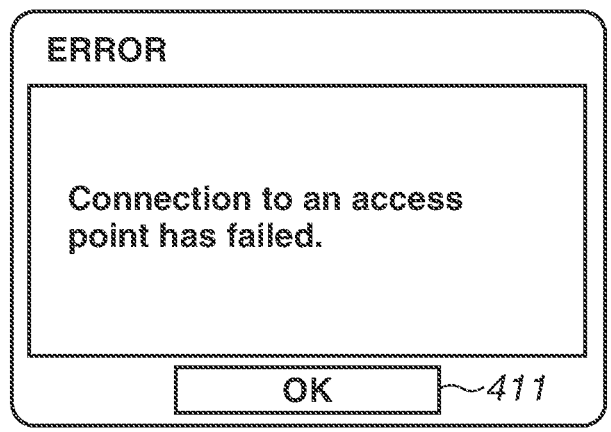
FIG. 4G is a diagram illustrating an example of a screen used for issuing a notification indicating that the image capturing apparatus in the first exemplary embodiment has failed in establishing connection to an AP which is displayed in the image capturing apparatus in the first exemplary embodiment.

A case where, in step S612, it is determined that establishment of connection to the AP 200 has failed is described. In step S613, the control unit 101 performs error processing. For example, the control unit 101 displays, on the display unit 106, a message for notifying the user that establishment of connection to the AP has failed, as illustrated in FIG. 4G. This enables the user to know that the image capturing apparatus 100 and the AP 200 have failed in establishment of connection. Then, when the user has selected the OK button 411, the control unit 101 returns the processing to step S601.

Next, a case where, in step S609, it is determined that the recorded password format is not the password format A is described.

In step S614, the control unit 101 determines whether the password format recorded in the working memory 104 in step S608 is the password format B. Thus, the control unit 101 determines whether the password format recorded in the working memory 104 in step S608 is a hexadecimal number with 64 characters. If it is determined that the recorded password format is the password format B (YES in step S614), the control unit 101 advances the processing to step S615. If it is determined that the recorded password format is not the password format B (NO in step S614), the control unit 101 advances the processing to step S618.

First, a case where, in step S614, it is determined that the recorded password format is the password format B is described.

In step S615, the control unit 101 sets "WPA/WPA2/WPA3 mixed" as a selection mode. The control unit 101 records, in the working memory 104, information indicating that "WPA/WPA2/WPA3 mixed" has been set as a selection mode.

In step S616, the control unit 101 controls the communication unit 111 to perform connection processing with respect to the AP. Processing in step S616 is similar to processing in step S611.

In step S617, the control unit 101 determines whether connection to the AP has been established in the connection processing performed in step S616. If it is determined that connection to the AP 200 has been established (YES in step S617), the control unit 101 advances the processing to step S622. If it is determined that establishment of connection to the AP 200 has failed (NO in step S617), the control unit 101 advances the processing to step S618. Furthermore, processing in step S622 is described below.

Next, a case where, in step S614, it is determined that the recorded password format is the password format B or a case where, in step S617, it is determined that establishment of connection to the AP has failed is described.

In step S618, the control unit 101 sets "WPA3 only" as a selection mode to the working memory 104. The control unit 101 records, in the working memory 104, information indicating that "WPA3 only" has been set as a selection mode. With this processing, even when the authentication method of the AP 200 is currently set to "WPA3 only", the image capturing apparatus 100 is able to connect to the AP 200.

In step S619, the control unit 101 controls the communication unit 111 to perform connection processing to the AP. The connection processing in step S619 is similar to processing in step S611. Furthermore, since, in the present step, the selection mode is "WPA3 only", the control unit 101 performs connection processing to the AP with use of the security method of WPA3.

In step S620, the control unit 101 determines whether connection to the AP has been established in step S619. If it is determined that connection to the AP 200 has been established (YES in step S620), the control unit 101 advances the processing to step S622. If it is determined that establishment of connection to the AP 200 has failed (NO in step S620), the control unit 101 advances the processing to step S621. Furthermore, if it is determined that establishment of connection to the AP 200 is successful, in a case where the password format recorded in the working memory 104 is the password format B, the control unit 101 overwrites the password format B with the password format C. Furthermore, processing in step S622 is described below.

Next, a case where, in step S620, it is determined that establishment of connection to the AP 200 has failed is described.

In step S621, the control unit 101 performs error processing. The error processing in step S621 is similar to processing in step S613.

Next, a case where, in step S612, step S617, or step S620, it is determined that establishment of connection to the AP 200 is successful is described.

In step S622, the control unit 101 controls the communication unit 111 to perform processing for allocating an Internet Protocol (IP) address.

In step S623, the control unit 101 records, in the non-volatile memory 103, information about the AP 200 connection to which has been established. The information about the AP 200 is described below with reference to FIG. 7. Moreover, in response to recording of the information about the AP 200 being completed, the control unit 101 displays, on the display unit 106, a message for notifying the user that recording of the information about the AP 200 is completed, as illustrated in FIG. 4F, and then ends the processing in the present flowchart.

Thus far is the description of the connection processing which the image capturing apparatus 100 performs.

FIG. 7 is a diagram illustrating an example of a database for pieces of information about APs each of which is recorded in step S623. The database is recorded in the non-volatile memory 103.

Parameters 700 which are recorded in the non-volatile memory 103 include a network participation parameter number, a connection sequential order, an SSID, an authentication method, a cipher type, a password, a password format, a channel, an IP address acquisition method, and a Domain Name System (DNS) acquisition method.

The row "network participation parameter number" indicates number information for managing a network formed by an AP which has ever established connection to the image capturing apparatus 100. When having first established connection to an AP information about which is not yet recorded, the control unit 101 adds a network participation parameter number.

The row "SSID" indicates an SSID of a network which the AP forms. For example, the row "SSID" indicates an SSID recorded in step S604 or step S606 illustrated in FIG. 6. The row "security" indicates a security method and an authentication method recorded in step S605 or step S606. The row "password" indicates a password recorded in step S607. The row "password format" indicates a password format recorded in step S609, step S614, or step S618.

Information about an AP recorded in the database illustrated in FIG. 7 is to be used when connection to the AP is performed again. Here, processing to be performed in a case where connection to an AP to which the image capturing apparatus 100 has ever connected is performed again is described.

For example, a case where the selection mode of an AP targeted for connection is "WPA3 only" and the password thereof corresponds to the password format C is described. This is a case where, for example, the image capturing apparatus 100 re-connects to an AP recorded in the parameter 703 illustrated in FIG. 7. In this case, since the password format C is recorded in the row "password format", the image capturing apparatus 100 performs connection processing to the AP with the selection mode "WPA3 only".

Moreover, for example, a case where the selection mode of an AP targeted for connection is "WPA2 only" and the password thereof corresponds to the password format B is described. This is a case where, for example, the image capturing apparatus 100 re-connects to an AP recorded in the parameter 702 illustrated in FIG. 7. In this case, since the password format B is recorded in the row "password format", the image capturing apparatus 100 performs connection processing to the AP with the selection mode "WPA/WPA2/WPA3 mixed".

In this way, in a case where the password format A or the password format B is recorded in the row "password format", the image capturing apparatus 100 performs connection processing to the AP with the selection mode "WPA/WPA2/WPA3 mixed". Moreover, in a case where the password format C is recorded in the row "password format", the image capturing apparatus 100 performs connection processing to the AP with the selection mode "WPA3 only".

The above-mentioned connection processing enables the image capturing apparatus 100 to, when having connected to an AP to which the image capturing apparatus 100 has ever connected, establish connection to the AP without performing determination processing such as that in step S617 illustrated in FIG. 6. With this processing, in connection processing to be performed for the second and subsequent times, the image capturing apparatus 100 is able to make a time required for connection shorter than in the connection processing performed for the first time.

Additionally, since the selection mode is determined based on the password format, even in a case where the selection mode is changed without the SSID and password of an AP being changed, the image capturing apparatus 100 is able to connect to the AP. This is because, if the password format of the password of the AP is the password format A or the password format B, the image capturing apparatus 100 is able to connect to the AP if the selection mode is "WPA/WPA2/WPA3 mixed". Moreover, this is because, if the password format of the password of the AP is the password format C, the image capturing apparatus 100 is able to connect to the AP if the selection mode is "WPA3 only". With this processing, even if there is a change in the selection mode of an AP, the image capturing apparatus 100 does not need to change information about the AP.

As described above, according to the first exemplary embodiment, in the "Personal" authentication method, the image capturing apparatus 100 is able to establish connection to an AP by automatically switching the selection mode. This enables even a user who is unfamiliar with the security standard called WPA to easily cause the image capturing apparatus 100 and the AP 200 to connect to each other. Moreover, the user is enabled to cause the image capturing apparatus 100 and the AP 200 to connect to each other without checking a security method and an authentication method of the AP 200.

Furthermore, in step S608, the control unit 101 determines the number of characters and character code of the password input by the user, but can be configured to determine the number of characters of the password. In this case, if the number of characters of the password is 8 or more and 63 or less, the control unit 101 sets "WPA/WPA2/WPA3 mixed" as the selection mode. Moreover, if the number of characters of the password is 1 or more and 7 or less, or 64 or more and 255 or less, the control unit 101 sets "WPA3 only" as the selection mode. Here, in the case of setting "WPA3 only" as a selection mode for use in connection to an AP, when having failed in establishment of connection to the AP, the control unit 101 re-determines the number of characters and character code of the password input by the user. If the password is a hexadecimal number with 64 characters, the control unit 101 sets "WPA/WPA2/WPA3 mixed" as a selection mode for use in connection to the AP, and performs connection processing to the AP again. Moreover, if the password is not a hexadecimal number with 64 characters, the control unit 101 performs error processing. This enables limiting patterns for determining character code of the password input by the user, so that it is possible to reduce a processing load on the control unit 101.

Furthermore, in step S615, the control unit 101 sets "WPA/WPA2/WPA3 mixed" as a selection mode for use in connection to an AP, but can be configured to set "WPA3 only" as a selection mode for use in connection to an AP. In this case, when having failed in establishment of connection to the AP, the control unit 101 sets "WPA/WPA2/WPA3 mixed" as a selection mode for use in connection to the AP, and performs connection processing to the AP again.

Furthermore, in the first exemplary embodiment, the image capturing apparatus 100 is configured to perform connection processing to an AP after determining a password format, but can be reversely configured to, after performing connection processing to an AP, determine a password format when having failed in establishment of connection to the AP. In this case, first, in connection processing to the AP, the control unit 101 sets "WPA/WPA2/WPA3 mixed" as the selection mode and then performs connection processing to the AP. However, in this selection mode, the image capturing apparatus 100 is not able to connect to an AP in which a password able to be used in only WPA3 is set. Therefore, when having failed in connection processing to an AP, the control unit 101 determines a password format input by the user and determines whether the input password is a password able to be used in only WPA3. If it is determined that the input password is a password able to be used in only WPA3, i.e., if the determined password format is the password format C, the control unit 101 sets "WPA3 only" as the selection mode and then performs connection processing to the AP again. With this processing, the control unit 101 does away with the need to determine the number of characters and character code of a password except in the case of performing connection to an AP in which a password able to be used in WPA3 is set, so that it is possible to reduce a processing load on the control unit 101.

Furthermore, in the first exemplary embodiment, as illustrated in FIG. 4D, even in the "Enterprise" authentication method, the image capturing apparatus 100 is configured to display security methods together as one item. However, in the "Enterprise" authentication method, even if the image capturing apparatus 100 displays security methods together as one item, an issue in which the user is not able to cause an apparatus intended to connect to an AP to connect to the AP does not occur. This is because, in connection processing that is based on the "Enterprise" authentication method, unlike connection processing that is based on the "Personal" authentication method, a security method is determined without depending on a condition for a password. In the following description, the reason is described.

In the "Enterprise" authentication method, as mentioned above, authentication processing compliant with the IEEE 802.1X standard is performed. In the authentication processing compliant with the IEEE 802.1X standard, for example, a certificate, a user identification (ID), and a password are used. While, in the "Personal" authentication method, a condition corresponding to a security method is stipulated in a password, in the "Enterprise" authentication method, a condition corresponding to a security method is not stipulated in a password. With regard to a certificate and a user ID, such a condition is also not stipulated. Therefore, in connection processing that is based on "Enterprise" authentication method, the image capturing apparatus 100 does not need to determine a condition for a password according to a security method. Thus, in the "Enterprise" authentication method, the above-mentioned connection processing that is based on a condition for a password, which is used in the "Personal" authentication method, is unnecessary.

Furthermore, in a case where an item "WPA/WPA2/WPA3-Enterprise" illustrated in FIG. 4D has been selected, the image capturing apparatus 100 connects to an AP by automatically using a security method highest in security strength out of security methods which the AP is able to use. In this connection processing, processing for determining a condition for a password is not performed.

While exemplary embodiments of the disclosure have been described above in detail, the disclosure is not limited to such specific exemplary embodiments, and various embodiments which do not depart from the gist of the disclosure are also included in the disclosure. Respective parts of the above-described exemplary embodiments can be combined as appropriate. Moreover, the case of suppling a program of software for implementing functions of the above-described exemplary embodiments to a system or apparatus including a computer capable of executing the program directly from a storage medium or by use of wired or wireless communication and thus executing the program is also included in the disclosure. Accordingly, program code itself supplied to and installed on the computer, which is used to cause the computer to implement functional processing in the disclosure, implements the disclosure. Thus, a computer program itself for implementing functional processing in the disclosure is also included in the disclosure. In that case, the computer program can be any form of program, such as object code, a program to be executed by an interpreter, or script data to be supplied to an operating system (OS), as long as it has a function of program. A storage medium used for supplying the program can be, for example, a magnetic recording medium, such as a hard disk or a magnetic tape, an optical or magnetooptical recording medium, or a non-volatile semiconductor memory. Moreover, a conceivable supplying method for the program can be a method of recording a computer program for the disclosure on a server located on a computer network and causing a connected client computer to download the program for programing thereof.

Moreover, the disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the disclosure can also be implemented by a circuit which implements such one or more functions (for example, an application specific integrated circuit (ASIC)).

Furthermore, the disclosure is not limited to just the above-described exemplary embodiments, but can be embodied by modifying constituent elements thereof within a range not departing from the gist of the disclosure in an implementation phase. Moreover, appropriate combinations of a plurality of constituent elements described in the above-described exemplary embodiments enable constituting various aspects of the disclosure. For example, some constituent elements can be deleted from all of the constituent elements described in the above-described exemplary embodiments. Additionally, constituent elements described in respective different exemplary embodiments can be combined as appropriate.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-036293 filed Mar. 8, 2021, which is hereby incorporated by reference herein in its entirety.

What is claimed is:

1. An apparatus comprising: an operation unit; a display unit; a communication unit; and a control unit, wherein the control unit controls the display unit to display, while indicating together as a first item, a plurality of security methods compatible with a first authentication method out of authentication methods in Wi-Fi Protected Access® (WPA), and while indicating as a second item, a security method for not performing authentication, wherein, in response to the first item being selected, the control unit controls the display unit to display a password input screen, and subsequently, the control unit causes the operation unit to receive inputting of a password for connecting to an access point, and wherein the control unit varies a security method in WPA used when connecting to the access point based on a format or number of characters of the password and wherein, even in a case where the format of the password is a format able to be used in a security method in WPA3, the control unit controls the recording unit to record all of the security methods in WPA, WPA2, and WPA3.

2. The apparatus according to claim 1, wherein display control performed by the display unit indicates WPA, WPA2, and WPA3 together as the first item.

3. The apparatus according to claim 1, wherein the control unit controls the communication unit to connect to the access point by a security method in WPA that is based on the number of characters of the password as the format of the password.

4. The apparatus according to claim 3, wherein the control unit controls the communication unit to connect to the access point by a security method in WPA that is further based on character code of the password as the format of the password.

5. The apparatus according to claim 4, wherein, in a case where the password is a character string with 8 or more and 63 or less characters or in a case where the password is a character string being a hexadecimal number with 64 characters, the control unit controls the communication unit to connect to the access point by a security method in any one of WPA, WPA2, and WPA3, and wherein, in a case where the password is a character string with 1 or more and 7 or less characters, in a case where the password is a character string with 65 or more and 255 or less characters, or in a case where the password is a character string not being a hexadecimal number with 64 characters, the control unit controls the communication unit to connect to the access point by a security method in WPA3.

6. The apparatus according to claim 4, wherein, in a case where the password is a character string being a hexadecimal number with 64 characters, if the control unit has failed in establishment of connection to the access point, the control unit controls the communication unit to connect to the access point by a security method in WPA3.

7. The apparatus according to claim 4, wherein, in a case where the password is a character string with 8 or more and 63 or less characters, the control unit controls the communication unit to connect to the access point by a security method in any one of WPA, WPA2, and WPA3, and wherein, in a case where the password is a character string with 1 or more and 7 or less characters or in a case where the password is a character string with 64 or more and 255 or less characters, the control unit controls the communication unit to connect to the access point by a security method in WPA3.

8. The apparatus according to claim 7, wherein, in a case where the password is a character string being a hexadecimal number with 64 characters, if the control unit has failed in establishment of connection to the access point, the control unit controls the communication unit to connect to the access point by a mode for connection using a security method in any one of WPA, WPA2, and WPA3.

9. The apparatus according to claim 1, wherein, in the first authentication method, the control unit controls the communication unit to connect to the access point by performing authentication processing using a pre-shared key.

10. The apparatus according to claim 1, wherein the control unit controls the display unit to display, while indicating together as a third item, a plurality of security methods compatible with a second authentication method out of authentication methods in WPA, and wherein, in response to the third item of the second authentication method being selected, the control unit controls the communication unit to connect to the access point by using a security method highest in security strength among security methods in WPA which the access point is able to use, without based on the format of the password.

11. The apparatus according to claim 10, wherein, in the second authentication method, the control unit controls the communication unit to connect to the access point by performing authentication processing compliant with IEEE 802.1X standard.

12. The apparatus according to claim 1, wherein, in a case where an SSID used for connecting to a desired access point is determined, the control unit controls the display unit to display a selection screen including the first item and the second item.

13. A method for an apparatus, the method comprising: displaying, while indicating together as a first item, a plurality of security methods compatible with a first authentication method out of authentication methods in Wi-Fi Protected Access® (WPA), and while indicating as a second item, a security method for not performing authentication; in response to the first item being selected, controlling the displaying to display a password input screen, and subsequently receiving inputting of a password for connecting to an access point; and varying a security method in WPA used when connecting to the access point based on a format or number of characters of the password and wherein, even in a case where the format of the password is a format able to be used in a security method in WPA3, the control unit controls the recording unit to record all of the security methods in WPA, WPA2, and WPA3.

14. The method according to claim 13, further comprising: connecting to the access point by a security method in WPA that is based on the number of characters of the password as the format of the password.

15. The method according to claim 13, further comprising: recording, if connection to the access point is established, the first authentication method and the format of the password as information about the access point in respective different regions.

16. The apparatus according to claim 13, further comprising: displaying, while indicating together as a third item, a plurality of security methods compatible with a second authentication method out of authentication methods in WPA; and connecting, in response to the third item of the second authentication method being selected, to the access point by using a security method highest in security strength among security methods in WPA which the access point is able to use, without based on the format of the password.

17. A non-transitory computer-readable storage medium storing computer-executable instructions that, when executed by a computer, cause the computer to perform a method for an apparatus, the method comprising: displaying, while indicating together as a first item, a plurality of security methods compatible with a first authentication method out of authentication methods in Wi-Fi Protected Access® (WPA), and while indicating as a second item, a security method for not performing authentication; in response to the first item being selected, controlling the displaying to display a password input screen, and subsequently receiving inputting of a password for connecting to an access point; and varying a security method in WPA used when connecting to the access point based on a format or number of characters of the password and wherein, even in a case where the format of the password is a format able to be used in a security method in WPA3, the control unit controls the recording unit to record all of the security methods in WPA, WPA2, and WPA3.

18. The non-transitory computer-readable storage medium according to claim 17, further comprising: connecting to the access point by a security method in WPA that is based on the number of characters of the password as the format of the password.

19. The non-transitory computer-readable storage medium according to claim 17, further comprising: recording, if connection to the access point is established, the first authentication method and the format of the password as information about the access point in respective different regions.

20. An apparatus comprising: an operation unit; a display unit; a communication unit; and a control unit, wherein the control unit controls the display unit to display, while indicating together as one item, a plurality of security methods compatible with a first authentication method out of authentication methods in Wi-Fi Protected Access® (WPA), wherein, in response to the item being selected, the control unit causes the operation unit to receive inputting of a password for connecting to an access point, wherein the control unit varies a security method in WPA used when connecting to the access point based on a format or number of characters of the password, wherein, if the control unit has established connection to the access point, the control unit controls the recording unit to record the first authentication method and the format of the password as information about the access point in respective different regions, and wherein, even in a case where the format of the password is a format able to be used in a security method in WPA3, the control unit controls the recording unit to record all of the security methods in WPA, WPA2, and WPA3.

\* \* \* \* \*